A. HANNAFORD.
BEATER ARMS FOR ANIMAL CLEANING OR DEHAIRING MACHINES.
APPLICATION FILED JUNE 12, 1908.
954,431.
Patented Apr. 12, 1910.
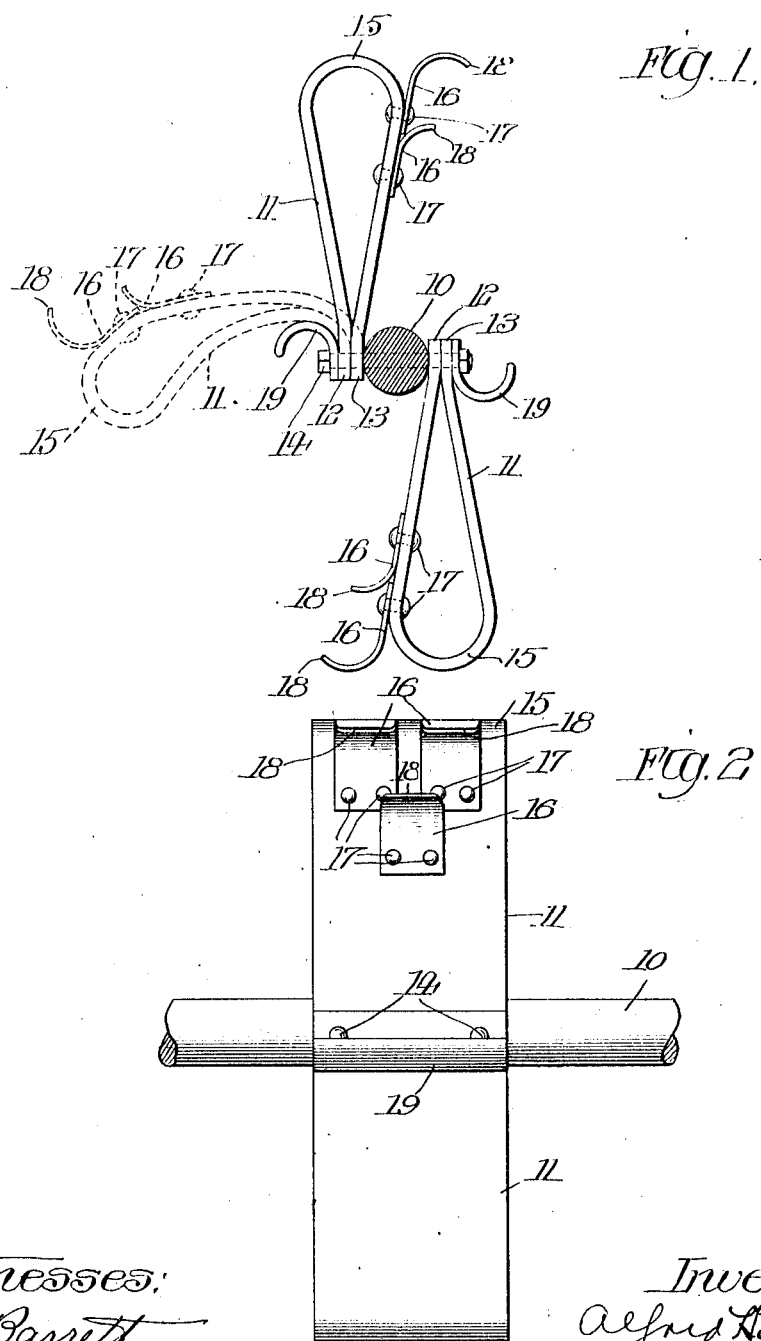

UNITED STATES PATENT OFFICE.

ALFRED HANNAFORD, OF CHICAGO, ILLINOIS, ASSIGNOR TO ALLBRIGHT-NELL COMPANY, A CORPORATION OF ILLINOIS.

BEATER-ARMS FOR ANIMAL CLEANING OR DEHAIRING MACHINES.

954,431.

Specification of Letters Patent. Patented Apr. 12, 1910.

Application filed June 12, 1908. Serial No. 433,151.

To all whom it may concern:

Be it known that I, ALFRED HANNAFORD, a citizen of the United States, residing at Chicago, in the county of Cook and State of Illinois, have invented certain new and useful Improvements in Beater-Arms for Animal Cleaning or Dehairing Machines, of which the following is a specification.

Beaters or beater arms for hog scraping machines heretofore have been constructed of a piece of flexible material, such as canvas, one end of which is attached to the shaft and the opposite end projects outwardly from the shaft and blades are secured on said outer end. Such beater arms do not act satisfactorily owing to the fact that the continual bending of the arms caused by the impact on the carcasses causes said arms or beaters to permanently set in a curve thereby destroying their flexibility and consequently their utility.

It is an object of this invention to provide a flexible beater adapted to act by impact on the carcasses to beat the hair, scurf, etc.
therefrom and which will not set in a permanent curve but which retains its elasticity for the entire life of the beater.

It is further an object of this invention to provide a beater in which both ends thereof are secured to the shaft and on the same side thereof providing two diverging arms connected by an integral loop, one arm of which acts to brace the other and in which one arm and the loop prevents buckling of the beater.

It is further an object of this invention to provide means for preventing the beaters bending short at the point of attachment to prevent the beaters cracking or breaking at this point.

It is further an object of this invention to provide a very simple beater, cheap to construct and which is highly efficient.

Figure 1 is an end elevation of devices embodying my invention. Fig. 2 is a side elevation thereof.

As shown in the drawings: 10, indicates a beater shaft mounted to rotate in any suitable manner and driven by any suitable means, which, inasmuch as it forms no part of this invention, is not shown.

The beaters indicated as a whole by 11, are each constructed of a single flexible strip of canvas or other suitable material which is folded together for its ends 12—13 to meet on one side of the shaft. From said superposed ends 12—13 the webs of the beater diverge outwardly forming two diverging arms which are integrally connected at their outer ends by a loop 15. Said beaters are secured to the shaft by means of bolts 14, which pass through both ends of the beater strip and through the shaft. Secured on the forward side of each beater are a plurality of blades 16, for whipping or beating the hair and scurf from the carcasses, which are secured thereto by means of rivets 17, or in any other preferred manner.

As shown, each blade is curved forwardly and the outer extremity 18, thereof lies in a plane in advance of the beater arm. To prevent the beater arms short bending at the point of attachment with the shaft, rearwardly curved guard plates 19, are provided, one secured on the rear side of each beater and around which the beater bends when the same strikes the carcasses.

The operation is as follows: As the shaft 10, constantly rotates the beaters strike the carcasses and the blades secured thereon whip and beat the bristles, scurf, nails, etc. from the carcasses, cleaning and polishing the same. The diverging arms of each beater connected by the loop form a resilient, yet comparatively stiff, beater. As each beater strikes the carcass, owing to the force of the impact the beater is somewhat flattened (as shown in dotted lines in Fig. 1) forcing the divergent arms closer together, slightly elongating the beater and decreasing the curvature of the loop. The beater arms are also bent at their inner ends around the curved guide 19, which increases the tension thereof adapting the beater when released to spring to normal position and the pressure at the outer end of the loop being released, said loop assumes its normal curvature forcing said arms to their normal degree of divergency. When bent around the guide 19, the arm of the beater is bent shorter than the forward arm. This increases the life of the forward arm and said rear arm acts as a powerful brace which is under greater tension than the forward arm and acts to force the forward arm to normal position when released. The loop when released from the carcass forces the arms to their normal degree of divergency which prevents said beater from permanently setting in a curve and consequently the beaters retain their elasticity for the entire life of the material of which constructed.

The arms may be arranged oppositely or staggered or in any desirable manner and in each instance the loops are directed transversely of the shaft.

Details of the construction may be varied and I do not desire to limit this application for patent otherwise than necessitated by the prior art.

I claim as my invention.

1. A beater formed of a strip of flexible and resilient material bent to form a loop at the outer portion and secured at the ends which are superposed.

2. A beater consisting of a strip bent to form oppositely inclined arms and a loop and metallic blades secured to one of the inclined arms.

3. In a device of the class described a shaft, a beater secured thereto formed with a loop at its outer end having the axis of curvature of the loop directed longitudinally of the shaft.

4. A beater formed of a strip of material having one end folded over the other end providing a loop at the outer end of the beater and metallic blades secured to the beater adjacent the loop.

5. A beater formed of a strip of flexible and resilient material bent to form a loop at the outer portion and secured at the ends and metallic blades secured to the beater.

6. In a device of the class described a shaft, a beater formed of a strip of flexible and resilient material bent to form a loop at the outer portion and the ends secured to the shaft, metallic blades secured to the beater and curved forwardly, and a curved guard plate secured to the shaft on the outer side of the ends.

7. A flexible and resilient beater constructed of a strip of material bent to form a loop, metallic blades secured to the beater curved forwardly and plates secured against the beater curved rearwardly to prevent short bending of the beater.

8. In a device of the class described a shaft, a beater secured thereto constructed of belting formed with a loop at the outer end thereof and having the greatest width of the belting directed longitudinally of the shaft.

In testimony whereof I have signed my name to this specification, in the presence of two subscribing witnesses, on this 10th day of June A. D. 1908.

ALFRED HANNAFORD.

Witnesses:
J. H. JOCHUM, Jr.,
M. W. CANTWELL.